(12) United States Patent
Kuo

(10) Patent No.: US 12,737,306 B1
(45) Date of Patent: Sep. 15, 2026

(54) VIRTUALIZED PARALLEL ACCESS ARCHITECTURE FOR FLASH MEMORY

(71) Applicant: Silicon Motion, Inc., Hsinchu County (TW)

(72) Inventor: Shiuan-Hao Kuo, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 19/075,804

(22) Filed: Mar. 11, 2025

(51) Int. Cl.
*G06F 12/00* (2006.01)
*G06F 11/10* (2006.01)
*G06F 13/16* (2006.01)

(52) U.S. Cl.
CPC ...... *G06F 13/1615* (2013.01); *G06F 11/1004* (2013.01); *G06F 13/1668* (2013.01)

(58) Field of Classification Search
CPC ............ G06F 13/1615; G06F 11/1004; G06F 13/1668
USPC ........................................................ 711/154
See application file for complete search history.

(56) References Cited

U.S. PATENT DOCUMENTS

2019/0294499 A1* 9/2019 Yang .................... G11C 29/028

FOREIGN PATENT DOCUMENTS

| | | | | |
|---|---|---|---|---|
| TW | 201732830 A | * | 9/2017 | G06F 3/0659 |
| TW | I802140 B | * | 5/2023 | G06F 3/0679 |

* cited by examiner

*Primary Examiner* — Mardochee Chery
(74) *Attorney, Agent, or Firm* — Winston Hsu

(57) ABSTRACT

A memory controller for controlling a flash memory includes a parallel accessing control circuit. The parallel accessing control circuit is coupled to a command and address (CA) bus, a first data bus, and a second data bus that are respectively coupled to a plurality of first memory units and a plurality of second memory units of the flash memory. The parallel accessing control circuit includes a CA sequencer configured to manage control signals and memory addresses that are transmitted over the CA bus; a first data input/output (DQ) sequencer configured to, through the first data bus, transmit/receive a first portion of encoded write/read data to/from one of first memory units; and a second DQ sequencer, configured to, through the second data bus, transmit/receive a second portion of the encoded write/read data to/from one of second memory units.

16 Claims, 4 Drawing Sheets

VIRTUALIZED PARALLEL ACCESS ARCHITECTURE FOR FLASH MEMORY

BACKGROUND OF THE INVENTION

1. Field of the Invention

The present invention relates to flash memory, and more particularly to a memory controller and a data storage device that implement intra-channel parallel access through memory virtualization in a flash memory system.

2. Description of the Prior Art

In conventional flash memory storage devices, a single channel between a memory controller and memory dies creates a performance bottleneck. Multi-channel architectures were developed to address this limitation by implementing multiple parallel data paths between the memory controller and the memory dies. This architecture significantly improves performance by allowing simultaneous access to multiple flash memory dies, thereby increasing overall bandwidth and reducing latency. The multi-channel architecture provides several advantages. First, it enables parallel execution of memory operations, such as read and write operations, across different channels. Second, it allows for better utilization of the processing capabilities of the memory controller. Third, it can reduce the impact of individual channel latency on overall system performance.

However, multi-channel architectures face significant limitations as flash memory technology advances. A critical limitation is that a single channel cannot effectively drive too many flash memory dies, particularly when operating at high I/O speeds or when handling low-tapped-termination (LTT) signals. This limitation becomes more pronounced as the number of memory dies per channel increases, leading to signal integrity issues and degraded performance. This has become increasingly problematic as the flash memory storage devices continue to evolve toward higher speeds and greater storage densities. The industry has attempted to address these challenges through various approaches, such as implementing I/O expander chips or interface chips. However, these solutions introduce additional complexity and cost to the system.

In view of the above, there exists a need in the art for a new architecture that can overcome the limitations of current multi-channel implementations while maintaining the benefits of parallel access to flash memory devices.

SUMMARY OF THE INVENTION

With this in mind, it is one object of the present invention to provide a memory controller that implements intra-channel parallel access in a flash memory-based data storage device, thereby improving data throughput and system performance while maintaining signal integrity. It is another object of the present invention to provide a novel parallel accessing control circuit design that enables simultaneous access to logically-grouped memory units through a shared command and address bus and separate data buses within a single access channel, effectively overcoming the limitations of conventional multi-channel architectures.

According to one embodiment, a memory controller for controlling a flash memory is provided. The memory controller comprises: a parallel accessing control circuit. The parallel accessing control circuit is coupled to a command and address (CA) bus, a first data bus, and a second data bus that are respectively coupled to a plurality of first memory units and a plurality of second memory units of the flash memory. The parallel accessing control circuit comprises: a CA sequencer, a first data input/output (DQ) sequencer and a second DQ sequencer. The CA sequencer is coupled to the CA bus and configured to manage one or more control signals and one or more addresses that are associated with a host command and transmitted over the CA bus. The first DQ sequencer is coupled to the first data bus and configured to, through the first data bus, transmit a first portion of encoded write data to one of the plurality of first memory units and/or receive a first portion of read encoded data from one of the plurality of first memory units. The second DQ sequencer is coupled to the second data bus and configured to, through the second data bus, transmit a second portion of the encoded write data to one of the plurality of second memory units and/or receive a second portion of the read encoded data from one of the plurality of second memory units.

According to one embodiment, a data storage device is provided. The data storage device comprises: a flash memory and a memory controller. The flash memory includes a plurality of first memory units and a plurality of second memory units. The memory controller is coupled to and configured to control the flash memory, and comprises: a parallel accessing control circuit. The parallel accessing control circuit is coupled to a command and address (CA) bus, a first data bus, and a second data bus that are respectively coupled to a plurality of first memory units and a plurality of second memory units of the flash memory. The parallel accessing control circuit comprises: a CA sequencer, a first data input/output (DQ) sequencer and a second DO sequencer. The CA sequencer is coupled to the CA bus and configured to manage one or more control signals and one or more addresses that are associated with a host command and transmitted over the CA bus. The first DQ sequencer is coupled to the first data bus and configured to, through the first data bus, transmit a first portion of encoded write data to one of the plurality of first memory units and/or receive a first portion of read encoded data from one of the plurality of first memory units. The second DQ sequencer is coupled to the second data bus and configured to, through the second data bus, transmit a second portion of the encoded write data to one of the plurality of second memory units and/or receive a second portion of the read encoded data from one of the plurality of second memory units.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
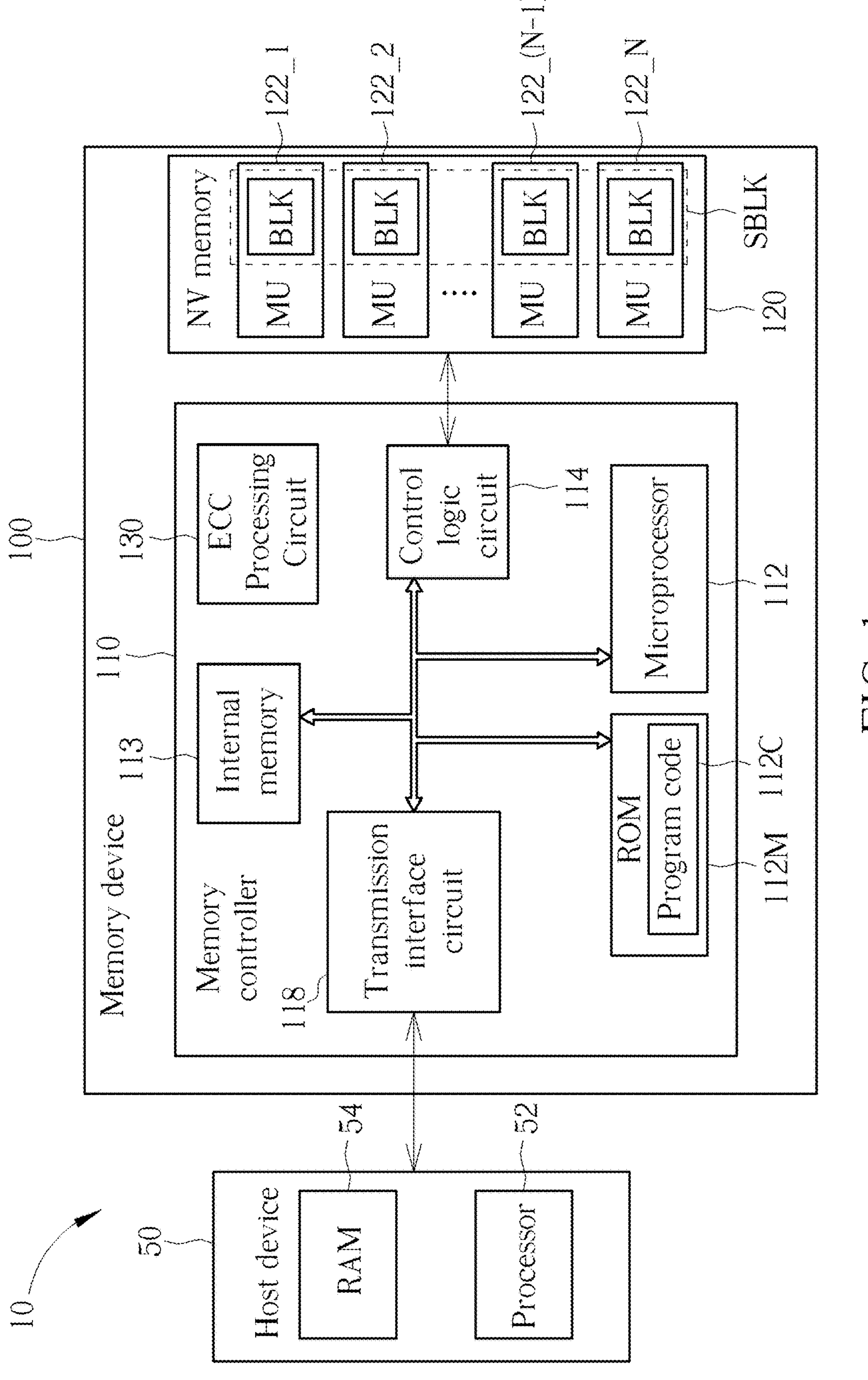
FIG. 1 illustrates a schematic diagram of an electronic device and a data storage device according to one embodiment of the present invention.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 is a schematic diagram illustrating an electronic device and a data storage device according to one embodiment of the present invention. As illustrated an electronic device 10 comprises a host device 50 and a data storage device 100. The host device 50 may comprise: at least one processor 52 configured to control operations of the host device 50, and a random access memory 54 configured to store data and information required by the processor 52. Examples of the host device 50 may include, but are not limited to: a smartphone, a tablet computer, a wearable device, a personal computer (such as, a desktop computer or a laptop computer), an imaging device (such as, a digital still camera or a video camera), a game console, a car navigation system, a printer, a scanner, or a server system. Examples of the data storage device 100 may include, but are not limited to: a portable memory device (such as a memory card conforming to SD/MMC, CF, MS, XD, or UFS specifications), a solid-state drive (SSD), and various embedded storage devices (such as an embedded storage device conforming to UFS or EMMC specifications).

According to various embodiments, the data storage device 100 may comprise a memory controller 110 and may further comprise a non-volatile (NV) memory 120. The NV memory 120 may comprise one or more NV memory elements, such as a plurality of NV memory elements (MU) 122_1-122_N. For example, the NV memory 120 may be a NAND flash memory, and the NV memory elements 122_1-122_N may be a plurality of NAND flash memory packages or a plurality of NAND flash memory dies, respectively, but the present invention is not limited thereto.

In some embodiments, the NV memory 120 may include a plurality of memory blocks BLK, which may be grouped into a plurality of superblocks SBLK. The memory block BLK may refer to a physical block and includes a plurality of memory cells. The superblock SBLK may be a unit of a logical memory region required for the memory controller 110 to manage the NV memory, where a composition of a superblock SBLK can span across NV memory chips 122_1-122_N. The memory block BLK may be implemented as a memory cell array in which a plurality of memory cells form a two-dimensional (2D) or three-dimensional (3D) array structure. The plurality of memory cells may be single-level cells programmed with one bit or multi-level cells (e.g., double-level cells, triple-level cells or quadruple-level cells) programmed with two bits or more. Moreover, the memory block BLK may include a plurality of pages, where memory cells connected to a same word line may constitute a page. For example, the memory block BLK may be a unit of an erase operation, and the page may be a unit of program and read operations.

In some embodiments, each of NV memory units 122_1-122_N is equipped with control circuitry for executing memory operation commands issued by the memory controller 110. Each of NV memory dies 122_1-122_N may include multiple planes, where each plane may have multiple blocks composed of memory cells, along with associated row and column control circuitry. Through multi-plane operation commands, various memory operations can be applied parallel on different planes to perform multi-plane reading, writing or erasing operations.

The memory controller 110 may comprise a processing unit 112, a read-only memory (ROM) 112M, an internal memory 113, a transmission interface circuit 118, an error checking and correction (ECC) processing circuit 130. At least one portion of these circuits and components may be coupled to one another through a bus. The internal memory 113 can be implemented by one or more RAM devices. For example, the internal memory 113 may comprise a static RAM (SRAM) and/or a dynamic RAM (DRAM). The internal memory 113 could be configured to provide internal storage space for the memory controller 110, for example, temporarily storing information, such as data, addresses, commands, mapping information, and/or variables/parameters. In some embodiments, the memory controller 110 may not include DRAM. Instead, the memory controller 110 may rely on host memory buffer (HMB) technology. With the HMB technology, the memory controller 110 could utilize the RAM 54 (such as DRAM) of the host device 50, as a whole, a part or an extension of the internal memory 113, thereby improving read and write performance of the data storage device 100.

In addition, the ROM 112M in this embodiment is configured to store program code 112C, and the microprocessor 112 is configured to execute the program code 112C, thereby controlling access to the NV memory 120. The program code 112C may include one or more program modules, such as boot loader code. When the data storage device 100 obtains power from the host device 50, the processing unit 112 may execute an initialization process of the data storage device 100 by executing the program code 112C. During the initialization process, the microprocessor 112 may load a set of in-system programming (ISP) codes (not shown in FIG. 1) from the NV memory 120. The microprocessor 112 can execute the ISP codes so that the data storage device 100 can be operable to perform various functions. According to one embodiment of the present invention, the set of ISP codes may include, but are not limited to: one or more program modules associated with memory access (e.g., reading, writing, and erasing), such as, a read operation module, a lookup table module, a wear leveling module, a read refresh module, a read reclaim module, and a garbage collection module, an sudden power-off recovery (SPOR) module, which are provided to perform corresponding reading, lookup table querying, wear leveling, read refreshing, read reclaiming, garbage collection, SPOR and other operations.

The memory controller 110 controls reading, writing, and erasing of the NV memory 120 through a flash control circuit 114. In addition, the memory controller 110 could perform writing of data based on host commands from the host device 50 and writing of valid data which is read from the NV memory 120 by a garbage collection and/or a wear-leveling operation concurrently. The transmission interface circuit 118 may conform to a specific communications specification, such as, Universal Serial Bus (USB) specification, Secure Digital (SD) interface, Ultra High Speed-I (UHS-I) interface, Ultra High Speed-II (UHS-II), CompactFlash (CF) interface, Multimedia card (MMC) interface, embedded Multimedia Card (eMMC) specification, Advanced Technology Attachment (ATA), Serial Advanced Technology Attachment (SATA), Parallel Advanced Technology Attachment (PATA), Peripheral Component Interconnect Express (PCI-E), and Universal Flash Storage (UFS) specification, and may perform communications with the host device 50 according to the specific communications specification.

Typically, the host device 50 may indirectly access the memory device 100, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, program or erase operations upon memory cells or data pages having physical addresses within the NV memory 120.

In some embodiments, a logical-to-physical (L2P) address mapping table having multiple L2P address mapping entries, can be divided into multiple mapping groups. Each mapping group includes a part of entries of the L2P address mapping table and is utilized for performing logical-to-physical address translation. These L2P mapping groups are permanently stored in blocks of NV memory 120 and are loaded into the internal memory 113 when needed. Similarly, a physical-to-logical (P2L) address mapping table having multiple P2L address mapping entries, can be divided into multiple mapping groups. Each mapping group includes a part of entries of the P2L address mapping table and is utilized for performing physical to logical address translation. These P2L mapping groups are permanently stored in blocks of NV memory 120.

Figure 2:
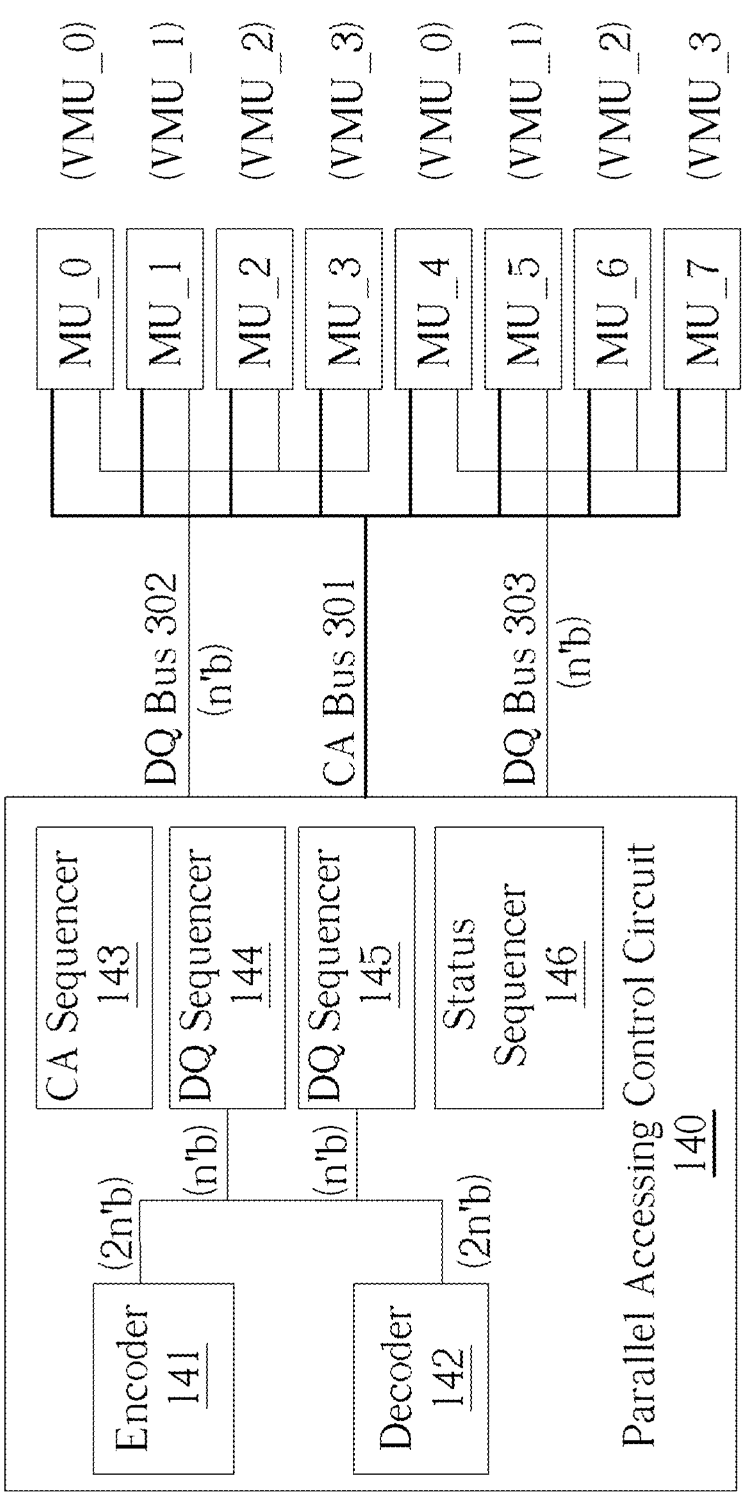
FIG. 2 illustrates a schematic diagram of a parallel accessing control circuit of a memory controller according to a first embodiment of the present invention.

The memory controller 110 includes a parallel accessing control circuit 140 that enables virtualized parallel access operations on the NV memory 120. The parallel accessing control circuit 140 is designed specifically for enhancing parallel data access within a single (access) channel, as illustrated in FIG. 2. The parallel accessing control circuit 140 includes an encoder 141, a decoder 142, a command and address (CA) sequencer 143, first and second data input/output (DO) sequencers 144 and 145, and a status checker 146. The encoder 141 has a 2n-bit output data width, while the decoder 142 has a corresponding 2n-bit input data width. Both the first and second DQ sequencers 144 and 145 operate with an n-bit input/output data width. This configuration establishes that the encoder output and decoder input widths are twice that of the input/output data width of the first and second DQ sequencers 144 and 145. The notation "n'b" and "2n'b" used in the figures adheres to Verilog hardware description language conventions for representing n-bit and 2n-bit wide data respectively.

The parallel accessing control circuit 140 is configured to control data access operations on memory units MU_0-MU_7 of the memory units 122_1-122_N through a command and address (CA) bus 301, a first data bus 302 and a second data bus 303. In particular, the CA sequencer 143 is coupled to the memory units MU_0-MU_7 through the CA bus 301 for management and transmission of control signals that are associated with a host command, such as control commands and memory addresses. The first DQ sequencer 144 is coupled to a first subset (e.g., MU_0-MU_3) of the memory units MU_0-MU_7 through the first data bus 302 for transmission of a first portion of encoded write data generated by the encoder 141 or for receiving a first portion of read encoded data that is read from memory units MU_0-MU_3 and to be decoded by the decoder 142. The second DQ sequencer 145 is coupled to a second subset (e.g., MU_4-MU_7) of the memory units MU_0-MU_7 through the second data bus 303 for transmission of a second portion of encoded write data generated by the encoder 141 or for receiving a second portion of read encoded data that is read from memory units MU_4-MU_7 and to be decoded by the decoder 142. In some embodiments, the parallel accessing control circuit 140 may include one or more signal drivers or buffers coupled between the CA sequencer 143/DQ sequencers 144-145 and the respective buses to ensure signal integrity and proper data transmission, particularly for high-speed operations or multiple memory units loading on the buses.

The encoder 141 may be implemented by the ECC processing circuit 130 and is configured, during a write operation, to receive data (e.g., user data from the host device 50) and to generate one or more ECC codewords (e.g., including a data portion and a parity portion) based on the data. According to various embodiments, the encoder 141 correspond to a may Reed-Solomon encoder, Bose-Chaudhuri-Hocquenghem (BCH) encoder, low-density parity check (LDPC) encoder, turbo encoder, or an encoder configured to encode the data according to one or more other ECC techniques, or a combination thereof, as illustrative, non-limiting examples. In addition, the decoder 142 may be implemented by the ECC processing circuit 130 and is configured, during a read operation, to receive data (e.g., codewords) from the first DQ sequencer 144 and the second DQ sequencer 145 to perform error detection and correction operations on the data, prior to the read data being provided to the host device 50. The decoder 142 may correspond to Reed-Solomon decoders, BCH decoders, LDPC decoders, turbo decoders, or decoders configured to decode the codewords according to one or more other ECC techniques, or a combination thereof, as illustrative, non-limiting examples.

In one embodiment, the memory unit MU_0 is associated with and logically grouped together with the memory unit MU_4 to form a first virtualized memory unit VMU_0, the memory unit MU_1 is associated with and logically grouped together with the memory unit MU_5 to form a second virtualized memory unit VMU_1, the memory unit MU_2 is associated with and logically grouped together with the memory unit MU_6 to form a third virtualized memory unit VMU_2, and the memory unit MU_3 is associated with and logically grouped together with the memory unit MU_7 to form a fourth virtualized memory unit VMU_3.

While the exemplary embodiment described above illustrates a configuration where two physical memory units are grouped to form a virtualized memory unit, the present invention is not limited to such implementation. In some embodiments, a virtualized memory unit may comprise three or more physical memory units, with the number of data buses scaled accordingly to accommodate parallel data access across all constituent physical memory units. For instance, a virtualized memory unit could be formed by grouping three physical memory units together, necessitating three separate data buses to maintain parallel data transfer capabilities, while still sharing a common command and address bus for synchronized control.

Furthermore, the total number of physical memory units managed by a single parallel accessing control circuit 140 may vary from the illustrated example. Depending on specific implementation requirements, system constraints, or performance optimization needs, the parallel accessing control circuit 140 may be configured to control fewer or more physical memory units than the eight units shown in the exemplary embodiment. This flexibility in configuration allows the architecture to be scaled and adapted for various application scenarios while maintaining the fundamental benefits of virtualized parallel access.

In particular, each physical memory unit (e.g., MU_0 or MU_4) of a virtualized memory unit (e.g., the first virtualized memory unit VMU_0) is configured to store different segments or portions of an ECC codeword. For example, the memory unit MU_0 is configured to store a first portion of an ECC codeword, while the memory unit MU_4 is configured to store a second portion of the same ECC codeword. In some embodiments, the first portion of an ECC codeword may correspond to odd-numbered bytes of an ECC codeword, while the second portion of the ECC codeword may correspond to even-numbered bytes of the ECC codeword. In some embodiments, the first portion of an ECC codeword may correspond to the first half of an ECC codeword, while the second portion of the ECC codeword may correspond to the second half of the ECC codeword.

The architecture enhances parallel access efficiency by implementing a virtualized memory unit framework, where physical memory units are logically grouped into cohesive virtualized memory units that support concurrent access through dedicated data buses. In the exemplary implementation, pairs of physical memory units (such as MU_0 and MU_4) are consolidated into virtualized memory units (such as VMU_0), enabling simultaneous access through the first data bus 302 and the second data bus 303.

During a write operation, the memory controller 110 is configured to use shared/same control signal(s)/command(s) and same memory (physical) address(es) to write different portions of an encoded write data to logically-grouped physical memory units (e.g., MU_0 and MU_4) forming a single virtualized memory unit (e.g., VMU_0). During a read operation, the memory controller 110 is configured to use shared/same control signal(s)/command(s) and same memory (physical) address(es) to read different portions of read encoded data from logically-grouped physical memory units forming a single virtualized memory unit, thereby achieving parallelism. This approach allows for interleaved data storage, which not only improves fault tolerance through ECC codeword distribution but also maximizes the utilization of data buses.

To achieve optimal logical grouping of memory units, two physical memory units (e.g., MU_0 and MU_4) grouped together to form a virtualized memory unit (e.g., VMU_0) should possess identical or similar physical characteristics and electrical parameters. In one embodiment, the logically-grouped physical memory units (e.g., MU_0 and MU_4) may be dies cut from a same wafer, preferably those positioned in close physical proximity during the fabrication process. This approach leverages the inherent consistency of semiconductor manufacturing within localized wafer areas, ensuring that logically-grouped physical memory units share nearly identical physical characteristics and electrical parameters, such as operational latency characteristics, signal propagation timing, power consumption profiles, threshold voltage distributions and/or temperature response behaviors. This approach selects dies from the same wafer region helps minimize process variation and maintain uniform performance across grouped memory units, ultimately contributing to efficient parallel data processing and robust ECC error correction.

To achieve optimal parallel access efficiency, in one embodiment, the memory controller 110 utilizes and maintains (e.g., update) a same read-retry table for performing read-retry operations on logically-grouped physical memory units (e.g., MU_0 and MU_4), because the logically-grouped physical memory units have similar threshold voltage shift characteristics. Typically, the threshold voltage shift refers to the change in threshold voltage levels of memory cells due to repeated program/erase cycles. Updating the same read-retry table for logically-grouped physical memory units would take threshold voltage shift of each of logically-grouped physical memory units into consideration. By maintaining this synchronized approach to read-retry management, the architecture ensures optimal read reliability while minimizing the overhead typically associated with independent read-retry operations. This unified management strategy not only enhances parallel access performance but also contributes to the overall endurance and reliability.

In some embodiments, the memory controller 110 employs the status checker 146 to perform status polling on the logically-grouped physical memory units (e.g., MU_0 and MU_4), thereby determining a status of a corresponding virtualized memory unit (e.g., VMU_0). In some embodiments, status polling is used to check whether an access operation (read, write, or erase) has completed (ready/busy state). For example, during read status check, the status checker 146 determines a read status of a virtualized memory unit (as a ready state) only if it is confirmed that logically-grouped physical memory units forming the virtualized memory unit have completed read operations and are ready. Similarly, during write status check, the status checker 146 determines a write status of a virtualized memory unit (as a ready state) only if it is confirmed that the logically-grouped physical memory units forming the virtualized memory unit have completed write operations and are ready. During erase status check, the status checker 146 determines an erase status of a virtualized memory unit (as a ready state) only if it is confirmed that the logically-grouped memory units forming the virtualized memory unit have completed erase operations and are ready.

In some embodiments, status polling is further used to check whether an access operation (read, write, or erase) is successful. For example, during read status check, the status checker 146 determines a read operation on a virtualized memory unit is successful only if it is confirmed that read operations on logically-grouped physical memory units forming the virtualized memory unit are all successful. Similarly, during write status check, the status checker 146 determines a write operation on a virtualized memory unit is successful only if it is confirmed that write operations on logically-grouped physical memory units forming the virtualized memory unit are all successful. During erase status check, the status checker 146 determines an erase operation on a virtualized memory unit is successful only if it is confirmed that erase operations on logically-grouped physical memory units forming the virtualized memory unit are all successful.

In some embodiments, if a write failure occurs on one of logically-grouped physical memory units (e.g., MU_0), both data at a failure address and data at a corresponding address in other one of the logically-grouped physical memory units (e.g., MU_4) are invalidated. This ensures data consistency within the virtualized memory unit and prevents potential data corruption during parallel access operations.

In some embodiments, the memory controller 110 maintains open blocks (i.e., memory blocks that are currently active and available for write operations) of logically-grouped physical memory units (e.g., MU_0 and MU_4) at a same/corresponding block address. This means that each physical memory unit within a virtualized memory unit holds an open block at a same/corresponding block address. Maintaining open blocks at the same addresses in logically-grouped physical memory units ensures efficient management of parallel access operations and reduces latency during memory transactions.

In some embodiments, during a garbage collection (GC) operation, the memory controller 110 is configured to select destination blocks for data migration based on blocks of logically-grouped physical memory units having a same/corresponding block address. This ensures that data being relocated during the GC operation is consistently stored in blocks with matching block addresses across the logically-grouped physical memory units, thereby maintaining address consistency, optimizing parallel access performance, and reducing potential address translation overhead in the memory controller 110.

In some embodiments, the determination of page validity and invalidity is maintained consistently across logically-grouped physical memory units forming a virtualized memory unit. Specifically, when a page of one of logically-grouped memory units determined and marked as a valid (or invalid) page, the memory controller 110 is configured to also determine and mark a corresponding page having a same/corresponding page address in other one of the logically-grouped memory units as a valid page.

In some embodiments, when a block of one of the logically-grouped memory units determined and marked as a bad block, the memory controller 110 is also configured to determine and mark a corresponding block having a same/corresponding block address in other one of the logically-grouped memory units as a bad block.

Figure 3:
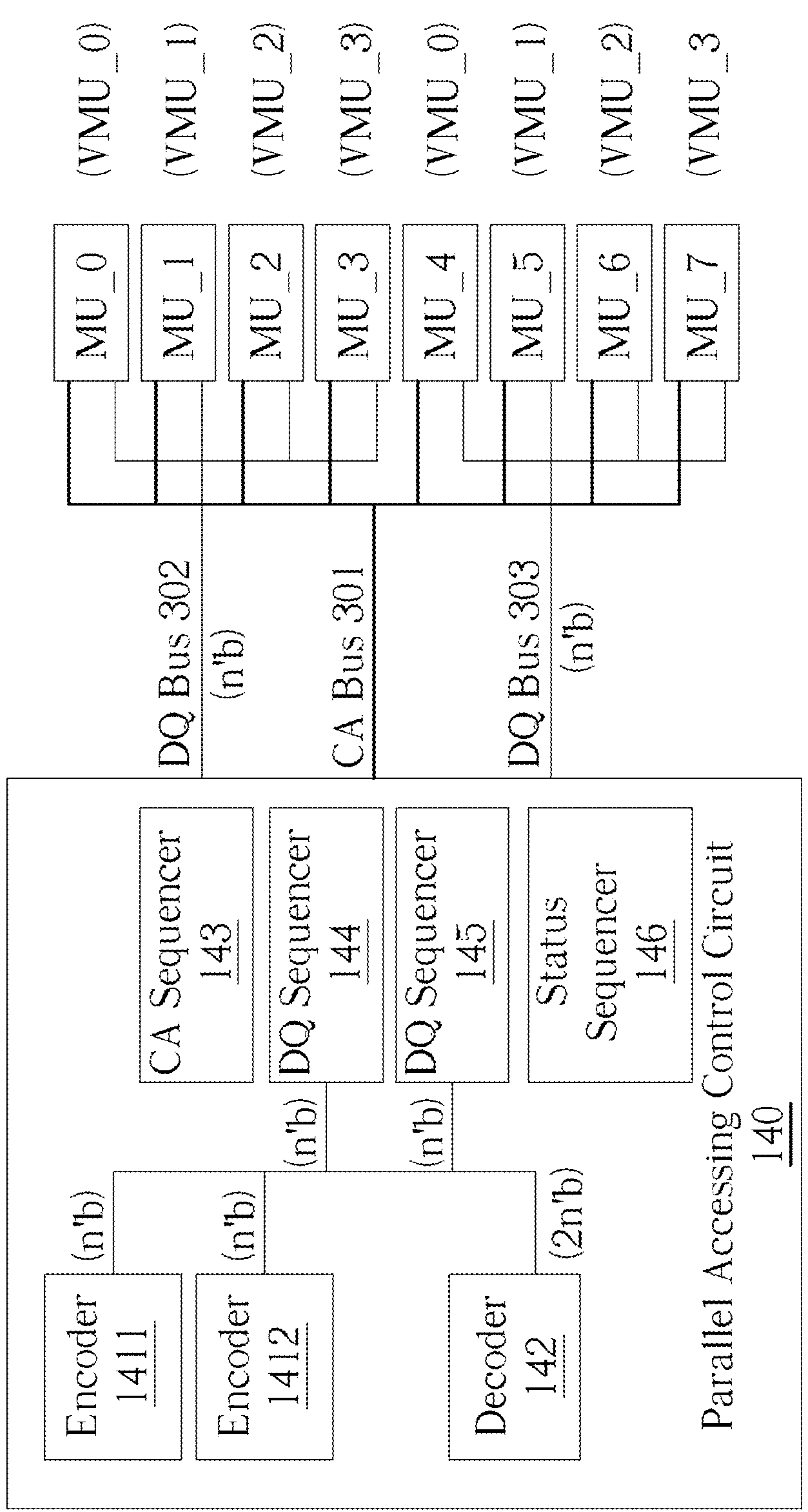
FIG. 3 illustrates a schematic diagram of a parallel accessing control circuit of a memory controller according to a second embodiment of the present invention.

FIG. 3 illustrates a schematic diagram of a parallel accessing control circuit according to another embodiment of the present invention. In this embodiment, the parallel accessing control circuit 140 is configured to perform one or more virtualized parallel access operations on the NV memory 120 and specifically designed for parallel data access within a single access channel. In contrast to the embodiment of FIG. 2, the parallel accessing control circuit 140 of FIG. 3 comprises two encoders rather than a single encoder. Specifically, the parallel accessing control circuit 140 in this embodiment comprises an encoder 1411 and an encoder 1412, where an output data width of both the encoder 1411 and the encoder 1412 is "n-bit," while the input data width of the decoder 142 remains "2n-bit."

In addition, the parallel accessing control circuit 140 is configured to control data access operations on memory units MU_0-MU_7 of the memory units 122_1-122_N through the CA bus 301, a first data bus 302 and a second data bus 303. In particular, the CA sequencer 143 is coupled to the memory units MU_0-MU_7 through the CA bus 301 for management and transmission of control signals, such as control commands and memory addresses that are associated with a host command. The first DQ sequencer 144 is coupled to a first subset (e.g., MU_0-MU_3) of the memory units MU_0-MU_7 through the first data bus 302 for transmission of a first encoded write data (e.g., an entire codeword) generated by the encoder 1411 or for receiving a first read encoded data (e.g., an entire codeword) that is read from memory units MU-MU_3 and to be decoded by the decoder 142. The second DQ sequencer 145 is coupled to a second subset (e.g., MU_4-MU_7) of the memory units MU_0-MU_7 through the second data bus 303 for transmission of a second encoded write data (e.g., an entire codeword) generated by the encoder 1412 or for receiving a second read encoded data (e.g., an entire codeword) that is read from memory units MU_4-MU_7 and to be decoded by the decoder 142.

Figure 4:
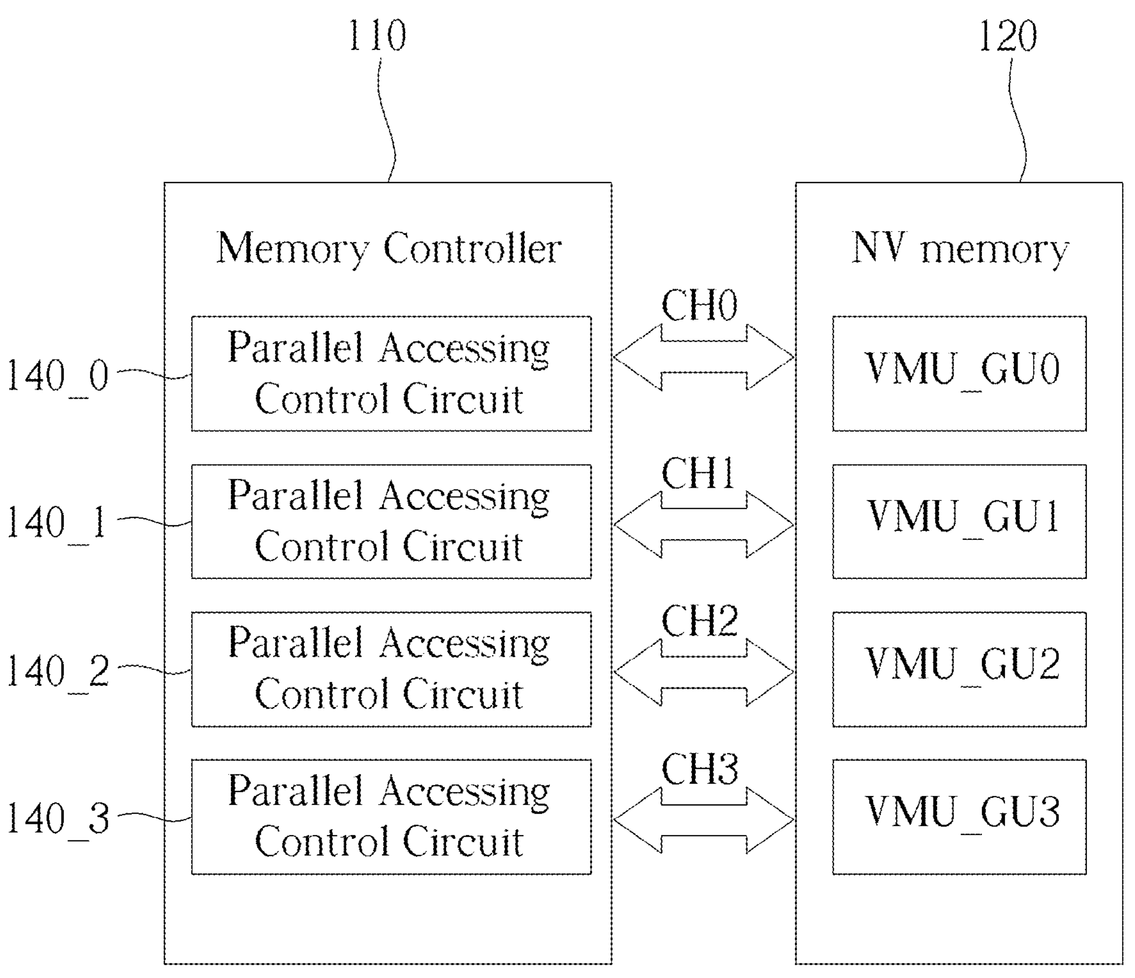
FIG. 4 illustrates a schematic diagram of a multi-channel memory controller according to one embodiment of the present invention.

FIG. 4 illustrates a schematic diagram of a multi-channel memory controller according to one embodiment of the present invention. In this embodiment, the NV memory 120 has multi-channel NAND flash memory architecture. The parallel accessing control circuits 140_0-140_3 are configured to respectively operate on multiple access channels CH0-CH3, each access channel providing independent data paths to different virtualized memory unit groups VMU_GU0-VMU_GU3. Specifically, operations of each of the parallel accessing control circuits 140_0-140_3 are substantially identical to those of the parallel accessing control circuit 140 illustrated by FIG. 2 or FIG. 3. This embodiment enables the memory controller 110 to apply parallel access techniques to a multi-channel architecture, allowing simultaneous read, write, and erase operations on each of access channels CH_0-CH3, wherein each assess channel is coupled to a distinct set of memory units 122_1-122_N. In particular, those memory units that are accessible through the access channel CH0 may form a first virtualized memory unit group VMU_GU0, those memory units that are accessible through the access channel CH1 may form a second virtualized memory unit group VMU_GU1, those memory units that are accessible through the access channel CH2 may form a third virtualized memory unit group VMU_GU2 and those memory units that are accessible through the access channel CH3 may form a fourth virtualized memory unit group VMU_GU3.

Specifically, each of virtualized memory unit groups VMU_GU0-VMU_GU3 includes a plurality of virtualized memory units (e.g., VMU_0-VMU_3) as mentioned above. Each of the virtualized memory units is formed by logically grouping one of a first subset (e.g. MU_0-MU_3) of the memory units 122_1-122_N and a corresponding one of a second subset (e.g. MU_4-MU_7) of the memory units 122_1-122_N. Each of the parallel accessing control circuit 140_0-140_3 coordinates with each access channel's CA bus and data buses to achieve parallel access on each access channel CH_0-CH_3, improving data throughput, reducing latency, and enhancing overall system performance.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller for controlling a flash memory, comprising:

a parallel accessing control circuit, coupled to a command and address (CA) bus, a first data bus, and a second data bus that are respectively coupled to a plurality of first memory units and a plurality of second memory units of the flash memory, wherein the parallel accessing control circuit comprises:

a CA sequencer coupled to the CA bus, configured to manage and transmit one or more control signals and one or more memory addresses that are associated with a host command and transmitted over the CA bus;

a first data input/output (DQ) sequencer coupled to the first data bus, configured to, through the first data bus, transmit a first portion of encoded write data to one of the plurality of first memory units and/or receive a first portion of read encoded data from one of the plurality of first memory units; and a second DQ sequencer coupled to the second data bus, configured to, through the second data bus, transmit a second portion of the encoded write data to one of the plurality of second memory units and/or receive a second portion of the read encoded data from one of the plurality of second memory units.

2. The memory controller of claim 1, wherein the first and second portions of the encoded write data are written to the flash memory according to one or more same control signals and one or more same memory addresses transmitted over the CA bus.

3. The memory controller of claim 1, wherein the first and second portions of the read encoded data are read from the flash memory according to one or more same control signals and one or more same memory addresses transmitted over the CA bus.

4. The memory controller of claim 1, wherein the parallel accessing control circuit further comprises:

an encoder configured to generate the encoded write data of 2n-bit width;

a decoder configured to decode the first and second portions of read encoded data of 2n-bit width that are provided by the first and second DQ sequencers;

wherein each of the first data bus and the second bus is n-bit width.

5. The memory controller of claim 1, wherein the encoded write data and the read encoded data are error correction code (ECC) codewords.

6. The memory controller of claim 5, wherein the first portion of the encoded write data corresponds to odd-numbered bytes of a first ECC codeword and the second portion of the encoded write data corresponds to even-numbered bytes of the first ECC codeword; and the first portion of the read encoded data corresponds to odd-numbered bytes of the first ECC codeword and the second portion of the read encoded data corresponds to even-numbered bytes of the first ECC codeword.

7. The memory controller of claim 5, wherein the first portion of the encoded write data corresponds to a first half of a first ECC codeword and the second portion of the encoded write data corresponds to a second half of the first ECC codeword; and the first portion of the read encoded data corresponds to a first half of the first ECC codeword and the second portion of the read encoded data corresponds to a second half of the first ECC codeword.

8. The memory controller of claim 1, wherein each of the plurality of first memory units is logically grouped together with a corresponding one of the plurality of second memory units and logically-grouped memory units form a virtualized memory unit.

9. The memory controller of claim 8, further comprising:

a status checker, configured to determine at least of one of read, write and erase status of the virtualized memory unit by detecting respective status of read, write and erase status of the logically-grouped memory units forming the virtualized memory unit.

10. The memory controller of claim 8, wherein the memory controller is configured to perform a read-retry operation on the virtualized memory unit by performing read-retry operations respectively on the logically-grouped memory units forming the virtualized memory unit based on a same read-retry table.

11. The memory controller of claim 8, wherein if a write failure occurs on one of the logically-grouped memory units, the memory controller is configured to invalidate both data at a failure address in the one of the logically-grouped memory units and data at a same address in other one of the logically-grouped memory units.

12. The memory controller of claim 8, wherein the memory controller is configured to maintain open blocks of the logically-grouped memory units at a same block address.

13. The memory controller of claim 8, wherein during a garbage collection operation, the memory controller is configured to select destination blocks for data migration based on blocks of the logically-grouped memory units having a same block address.

14. The memory controller of claim 8, wherein when a page of one of logically-grouped memory units determined and marked as a valid page, the memory controller is configured to determine and mark a corresponding page having a same page address in other one of the logically-grouped memory units as a valid page.

15. The memory controller of claim 8, wherein when a block of one of the logically-grouped memory units determined and marked as a bad block, the memory controller is configured to determine and mark a corresponding block having a same block address in other one of the logically-grouped memory units as a bad block.

16. A data storage device, comprising:

a flash memory including a plurality of first memory units and a plurality of second memory units; and a memory controller coupled to and configured to control the flash memory, comprising:

a parallel accessing control circuit, coupled to a command and address (CA) bus, a first data bus, and a second data bus that are respectively coupled to the plurality of first memory units and the plurality of second memory units, wherein the parallel accessing control circuit comprises:

a CA sequencer coupled to the CA bus, configured to manage and transmit one or more control signals and one or more memory addresses that are associated with a host command and transmitted over the CA bus;

a first data input/output (DQ) sequencer coupled to the first data bus, configured to, through the first data bus, transmit a first portion of encoded write data to one of the plurality of first memory units and/or receive a first portion of read encoded data from one of the plurality of first memory units; and a second DQ sequencer coupled to the second data bus, configured to, through the second data bus, transmit a second portion of the encoded write data to one of the plurality of second memory units and/or receive a second portion of the read encoded data from one of the plurality of second memory units.

* * * * *